US011772622B2

(12) United States Patent
Landers

(10) Patent No.: US 11,772,622 B2
(45) Date of Patent: Oct. 3, 2023

(54) VEHICLE BRAKE PEDAL TRAVEL BASED ON BRAKING FORCE AVAILABLE BETWEEN BRAKING WHEELS AND GROUND

(71) Applicant: Gulfstream Aerospace Corporation, Savannah, GA (US)

(72) Inventor: Thomas F. Landers, Savannah, GA (US)

(73) Assignee: Gulfsteam Aerospace Corporation

(*) Notice: Subject to any disclaimer, the term of this patent is extended or adjusted under 35 U.S.C. 154(b) by 662 days.

(21) Appl. No.: 15/929,781

(22) Filed: May 21, 2020

(65) Prior Publication Data

US 2021/0362699 A1    Nov. 25, 2021

(51) Int. Cl.
| | |
|---|---|
| B60T 13/66 | (2006.01) |
| B60T 7/04 | (2006.01) |
| B60T 8/17 | (2006.01) |
| B60T 8/176 | (2006.01) |
| B60T 8/18 | (2006.01) |
| B60T 8/32 | (2006.01) |
| B64C 25/46 | (2006.01) |

(52) U.S. Cl.
CPC ............ B60T 13/662 (2013.01); B60T 7/042 (2013.01); B60T 8/1703 (2013.01); B60T 8/176 (2013.01); B60T 8/18 (2013.01); B60T 8/325 (2013.01); B64C 25/46 (2013.01); B60T 2210/10 (2013.01); B60T 2240/00 (2013.01); B60T 2250/02 (2013.01); B60T 2270/10 (2013.01); B60T 2270/82 (2013.01)

(58) Field of Classification Search
CPC ..................................................... B60T 8/1703
See application file for complete search history.

(56) References Cited

U.S. PATENT DOCUMENTS

| | | | |
|---|---|---|---|
| 6,890,041 B1 * | 5/2005 | Ribbens | ................. B64C 25/46 |
| | | | 303/126 |
| 2007/0222285 A1 | 9/2007 | Ribbens et al. | |

FOREIGN PATENT DOCUMENTS

| | | |
|---|---|---|
| EP | 3115267 A1 | 1/2017 |
| GB | 2411934 A | 9/2005 |

* cited by examiner

*Primary Examiner* — Imran K Mustafa
(74) *Attorney, Agent, or Firm* — LKGlobal | Lorenz & Kopf, LLP

(57) ABSTRACT

An aircraft includes a brake lever for receiving a pilot braking input as a lever travel of the brake lever, a braking wheel operatively coupled with the brake lever to brake the aircraft based on the lever travel, a brake actuator operatively coupled with the braking wheel to apply a braking force in response to a braking pressure provided to the brake actuator, and a brake pressure circuit. The brake pressure circuit is configured for: estimating a maximum braking pressure above which the braking wheel will skid with respect to a ground surface; scaling a lever gain of the brake lever to command the maximum braking pressure at a full travel of the brake lever such that a remaining brake lever travel indicates the amount of braking capability remaining for the aircraft; and braking the braking wheel based on the lever gain and the lever travel.

20 Claims, 4 Drawing Sheets

VEHICLE BRAKE PEDAL TRAVEL BASED ON BRAKING FORCE AVAILABLE BETWEEN BRAKING WHEELS AND GROUND

TECHNICAL FIELD

The present disclosure generally relates to aircraft braking systems, and more particularly relates to aircraft braking systems that scales a brake pressure gain to command a maximum braking force at a full travel of a brake lever such that a remaining brake lever travel indicates the amount of braking capability remaining for the aircraft.

BACKGROUND

Aircraft are equipped with wheel brakes to slow the aircraft while the aircraft is traveling on the ground. The wheel brakes are typically designed to provide more braking power than can be transmitted between the landing gear tires and the runway surface. For example, anti-lock brake functions are typically implemented to reduce the amount of braking applied when the wheels are at risk of becoming locked and sliding across the ground surface.

The power that can be transmitted between the wheels and the ground surface depends on the environmental conditions, tire properties, ground condition, the normal force on the tires, and other factors. The braking ability of the aircraft may be significantly reduced in wet conditions, in snowy conditions, or when loose gravel or other debris is present on the runway. Reduced braking ability may create difficulties landing the aircraft on short runways or when landing at high speeds.

Typical aircraft braking systems command brake pressure of the braking system based on brake lever travel distance according to how far the pilot presses the brake lever. In aircraft with anti-skid systems, the anti-skid limit protects from applying more brake pressure than the aircraft can tolerate without causing the tires to skid. When external factors such as runway condition and aircraft weight are considered, this maximum amount of brake pressure can vary significantly. A heavy aircraft on a dry runway will tolerate high brake pressures, which require a large pilot command.

When the aircraft is lighter (due to lower fuel condition or lighter passenger/cargo loading) and is on a wet or slippery runway, the brake system will only tolerate a low brake pressure before the anti-skid system limits performance. When landing the aircraft at light weights the pilot may command only a modest amount of braking thinking that there is significant additional braking still available because there is a lot of brake lever travel remaining. In fact, the pilot may be using nearly all of the braking capability. The pilot may then infer from the low lever travel that the aircraft braking is more capable than it really is for future stops under similar conditions.

Accordingly, it is desirable to provide methods, systems, and aircraft that permit increased awareness of the braking capability in various conditions, so the pilot can have a better awareness of remaining braking capability. Furthermore, other desirable features and characteristics of the present disclosure will become apparent from the subsequent detailed description and the appended claims, taken in conjunction with the accompanying drawings and the foregoing technical field and background.

SUMMARY

In general, the embodiments provided herein provide a brake control system that can take in additional information, such as aircraft weight and estimated runway condition, and adjust the brake lever to brake pressure relationship such that full travel of the brake levers is only slightly above the anti-skid limit, such that the pilot will have a tactile estimation of how much of the usable braking is being commanded.

In a first non-limiting example, An aircraft includes a brake lever for receiving a pilot braking input as a lever travel of the brake lever, a braking wheel operatively coupled with the brake lever to brake the aircraft based on the lever travel, a brake actuator operatively coupled with the braking wheel to apply a braking force in response to a braking pressure provided to the brake actuator, and a brake pressure circuit. The brake pressure circuit is configured for: estimating a maximum braking pressure above which the braking wheel will skid with respect to a ground surface; scaling a lever gain of the brake lever to command the maximum braking pressure at a full travel of the brake lever such that a remaining brake lever travel indicates the amount of braking capability remaining for the aircraft; and braking the braking wheel based on the lever gain and the lever travel.

In a second non-limiting example, a vehicle includes a brake lever, a braking wheel, and a brake pressure circuit. The brake lever is configured for receiving a driver braking input as a lever travel of the brake lever. The braking wheel is operatively coupled with the brake lever to brake the vehicle based on the lever travel. The brake pressure circuit is configured for: estimating a maximum braking force above which the braking wheel will skid with respect to a ground surface; scaling a lever gain of the brake lever to command the maximum braking force at a full travel of the brake lever such that a remaining brake lever travel indicates the amount of braking capability remaining for the vehicle; and braking the braking wheel based on the lever gain and the lever travel.

In a third non-limiting example, a method of braking a vehicle on a ground surface includes: retrieving a ground condition of a ground surface on which the vehicle is operating; determining a normal force on the ground surface at a braking wheel of the vehicle; estimating a ground skid pressure of a braking system of the vehicle at which the braking wheel begins to slide with respect to the ground surface; scaling a lever gain of a brake lever to command the ground skid pressure at a full travel of the brake lever; and commanding the braking system based on the lever gain.

BRIEF DESCRIPTION OF THE DRAWINGS

Advantages of the present disclosure will be readily appreciated, as the same becomes better understood by reference to the following detailed description when considered in connection with the accompanying drawings wherein.

DETAILED DESCRIPTION

The following detailed description is merely exemplary in nature and is not intended to limit the application and uses.

Furthermore, there is no intention to be bound by any expressed or implied theory presented in the preceding technical field, background, brief summary or the following detailed description.

In general, the embodiments described herein improve awareness for the vehicle operator of how much vehicle braking capability remains. Specifically, the remaining brake lever travel indicates to the vehicle operator how much brake capability remains in terms of ground traction. In contrast, the remaining brake lever travel in conventional systems indicates how much hydraulic pressure is available to apply to the braking system regardless of how close the braking is to the traction limit between the wheels and the ground surface. For vehicles with large weight differences between fully loaded and unloaded conditions, (e.g., aircraft, freight trucks), the embodiments provide a significant and noticeable difference to the vehicle operator.

In addition to awareness of braking capability remaining, the embodiments described herein assist the pilot with comfortable braking for passengers. For example, a lightly loaded aircraft in dry conditions will decelerate very quickly with low commanded brake pressures. By scaling the pressure according to the braking capabilities, the lightly loaded aircraft will decelerate slower for a given lever travel because the lightly loaded aircraft will reach the anti-skid limit at lower brake pressures, as will become apparent from the discussion below.

Figure 1:
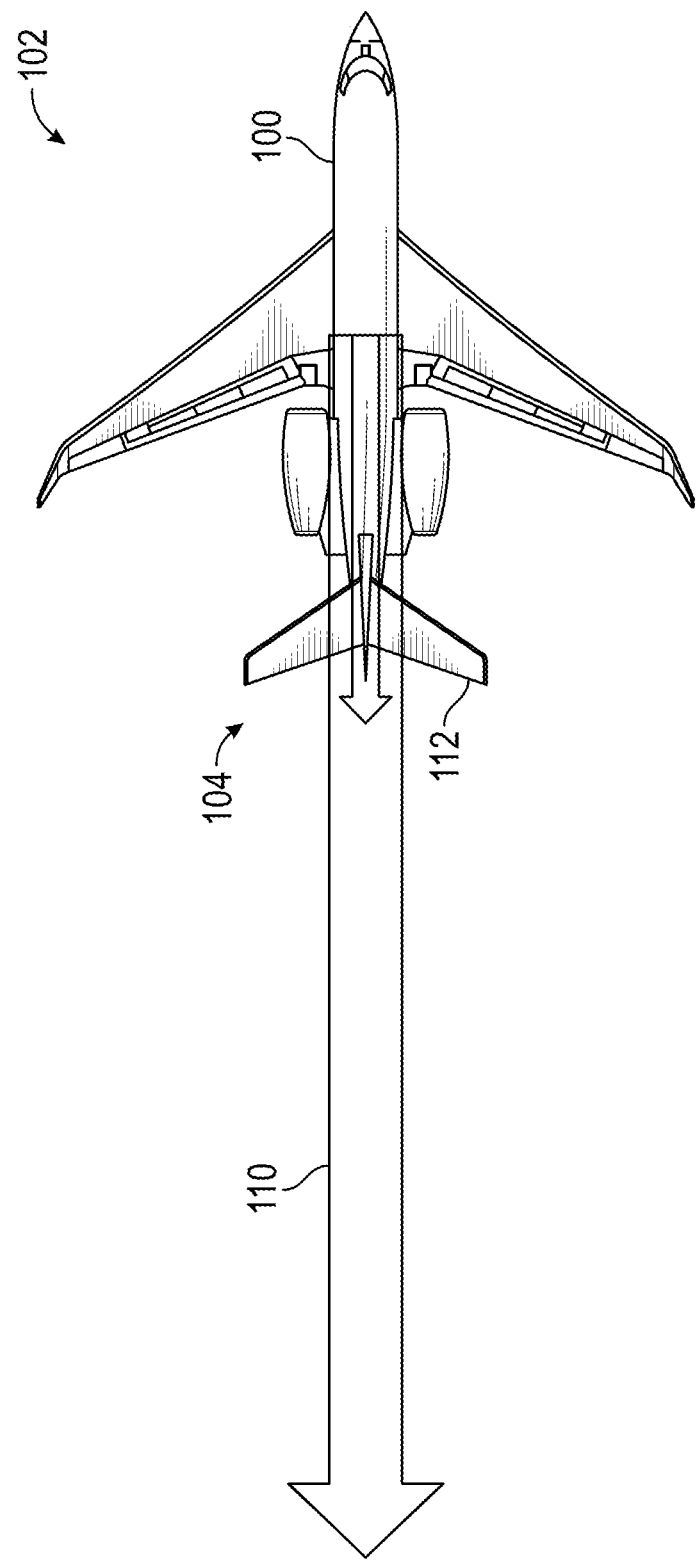
FIG. 1 is a simplified top view of an aircraft during a braking event, in accordance with various embodiments.

Referring now to FIG. 1, an example of an aircraft 100 is illustrated during a braking segment of a landing phase of a flight on a ground surface 102 in accordance with some embodiments. Various forces 104 acting on aircraft 100 under differing conditions are shown to help illustrate the benefits and operation of the systems and methods described herein. In some embodiments, the embodiments described herein are applied to other vehicles. Notably, freight trucks and trains may have large weight differences between loaded and unloaded conditions.

Forces 104 include an ideal maximum braking force 110 and a worst-case maximum braking force 112. Ideal maximum braking force 110 indicates the amount of braking force the ground surface 102 and braking wheels of aircraft 100 will be able to provide for braking aircraft 100 under dry conditions with the aircraft 100 fully loaded with fuel and passengers. Worst-case maximum braking force 112 indicates the amount of braking force the ground surface 102 and braking wheels of aircraft 100 will be able to provide for braking aircraft 100 under wet/slick conditions with aircraft 100 lightly loaded with fuel and passengers.

In the example provided, ideal maximum braking force 110 is approximately four times larger than worst-case braking force 112. The maximum braking force Fmax is calculated according to eq. 1:

$$F\text{max} = \mu_{tires} * N \quad \text{(eq. 1)}$$

Mu tires (μtires) is the coefficient of friction between the tires and the ground surface. N is the normal force acting between aircraft 100 and ground surface 102 perpendicular to ground surface 102. For a level runway the normal force is typically dominated by the weight of the aircraft, but may increase or decrease due to aerodynamic forces when the aircraft is at high speed. Therefore, the maximum braking force decreases with decreasing coefficient of friction (e.g., wet/slick conditions) and decreases with lighter weight aircraft (e.g., lightly loaded with fuel and/or passengers).

The maximum force applied to the braking wheels from the brake pads (Fbrake) of the aircraft braking system is similarly given according to eq. 2:

$$F\text{brake} = \mu_{brakes} * N_{brakes} \quad \text{(eq. 2)}$$

Mu brakes (μbrakes) is the coefficient of friction between the brake pads and the rotors of the braking system of aircraft 100. Nbrakes is the force applied by the brake pads on the rotors of the brake system, and is proportional to the brake pressure commanded by the braking system. In the example provided, an anti-skid system effectively limits Fbrake to be less than Fmax, as will be appreciated by those with ordinary skill in the art.

In a system with sufficient brake pressure capability to command Fmax to the anti-skid limit at a given weight in dry conditions, deceleration (amax) of aircraft is then given by eq. 3:

$$a\text{max} = F\text{max}/\text{weight} = \mu \quad \text{(eq. 3)}$$

Figure 2:
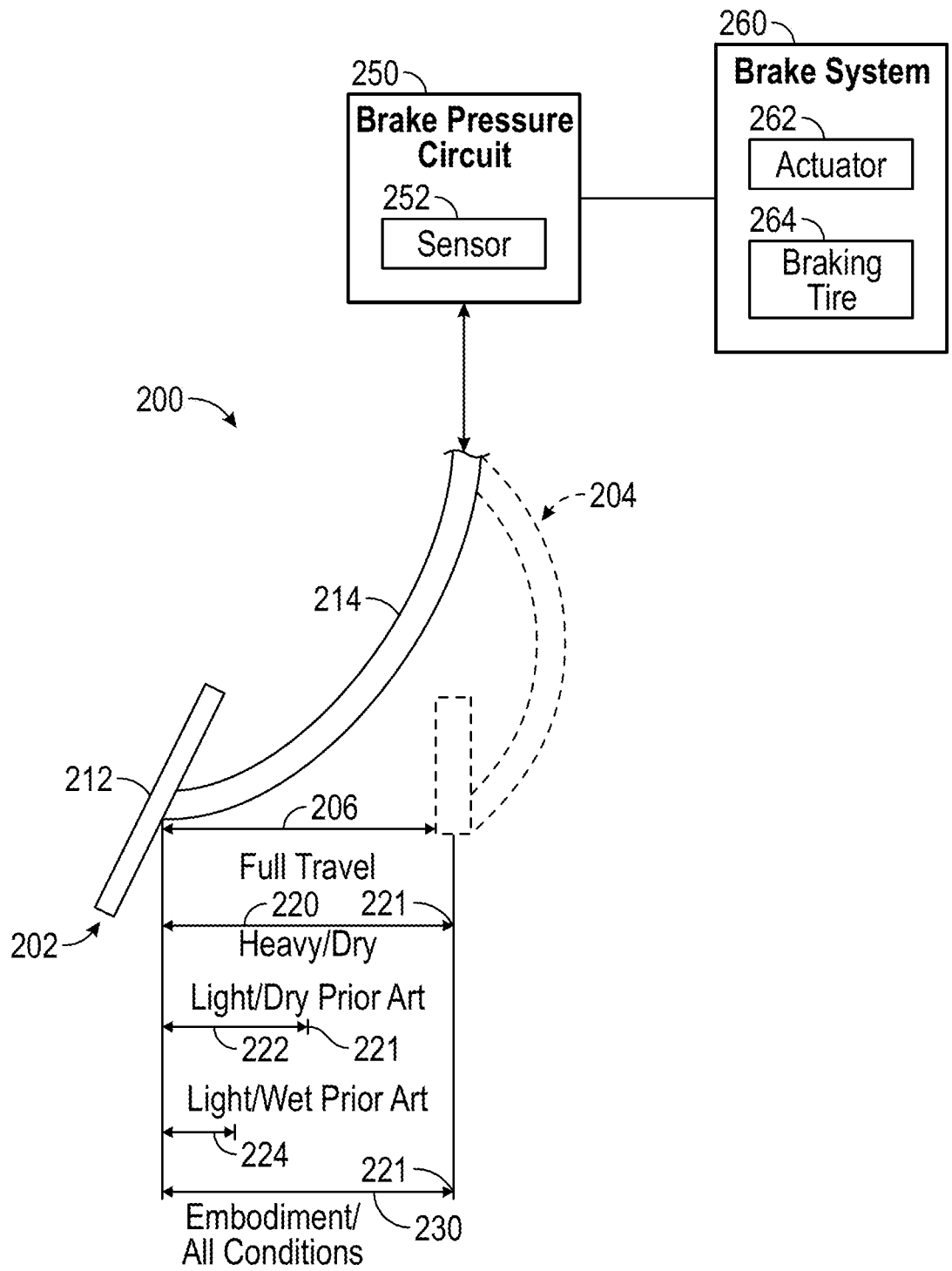
FIG. 2 is a simplified diagram of a brake lever of the aircraft of FIG. 1, in accordance with various embodiments.
Figure 3A:
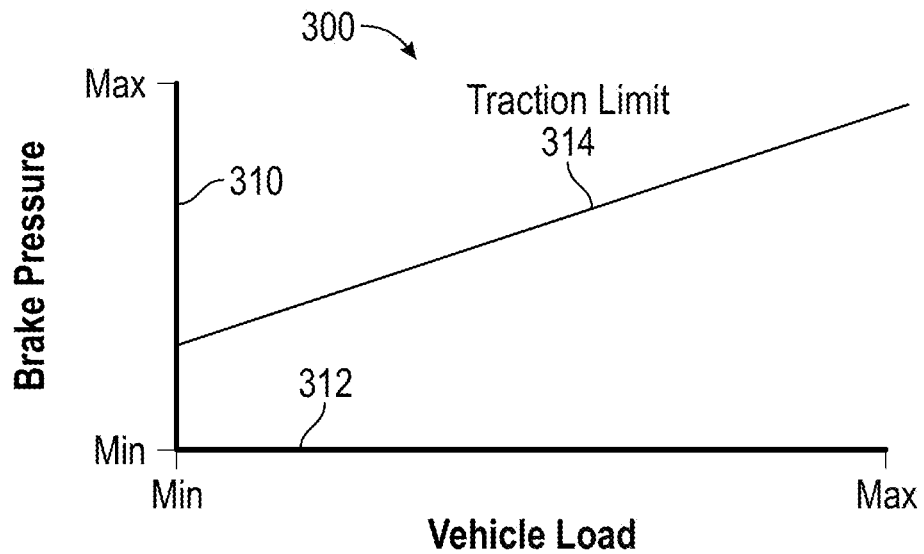
FIG. 3A and FIG. 3B are graphs illustrating the relationship between vehicle load and brake pressure and between ground conditions and brake pressure.
Figure 3B:
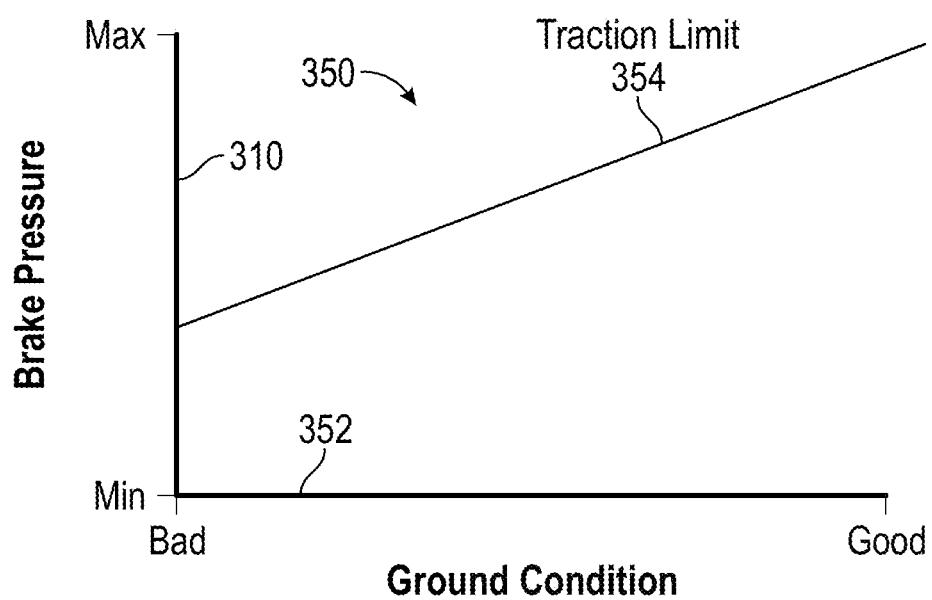

Referring now to FIGS. 2, 3A, and 3B, and with continued reference to FIG. 1, a lever travel 200 of a brake lever 202 and traction limit graphs 300 and 350 are illustrated. In the example provided, brake lever 202 is a foot actuated brake pedal. In some embodiments, multiple pedals provide braking for multiple sets of braking wheels or for different parts of the vehicle. For example, in large trucks, a first brake pedal may control braking for the tractor/cab and a second brake pedal may control brakes on the trailer. In some embodiments, the brake lever is a hand operated handle in the flight deck of the aircraft. Brake lever 202 includes a foot support portion 212 and a linking arm portion 214. A pilot of aircraft 100 presses foot support portion 212 to move brake lever through a lever travel 206 between the illustrated resting position and a full lever travel position 204.

Conventional brake systems utilize a fixed brake pressure relationship where the maximum possible brake pressure is commanded at the full travel position 204. Where the braking wheels lockup depends largely on the ground condition 352 and the vehicle load 312, as illustrated in FIGS. 3A and 3B. A traction limit 314 at which the wheels lockup occurs at a higher brake pressure 310 as the vehicle load 312 increases. Similarly, a traction limit 354 at which the wheels lockup occurs at a higher brake pressure 310 with improving ground conditions 352. Accordingly, wheel lockup occurs at the highest pressure in a heavy loaded vehicle with good ground conditions. Conversely, the lowest brake pressure at which wheel lockup occurs is for a lightly loaded vehicle with poor ground surface conditions.

Lever travel 220 illustrates how wheel lockup 221 occurs at the full travel position 204 in heavy loading in dry conditions in both conventional systems and the embodiments described herein. Lever travel 222 illustrates how wheel lockup 221 occurs at about half of full pedal position 204 of lever travel 206 in lightly loaded and dry conditions using conventional systems. Lever travel 224 illustrates how wheel lockup 221 occurs at about one quarter of full pedal position 204 of lever travel 206 in lightly loaded and wet conditions using conventional systems. In contrast, the embodiments described herein reach wheel lockup 221 at lever travel 230 for all loading and ground surface conditions due to a lever gain that is adjusted according to the method described below. In the example provided, lever travel 230 is at the full travel position 204 of brake lever 212. As used herein, the term "full travel" refers to the longest travel value that will result in increasing brake pressure applied to the brake system according to the lever gain before adjustment according to task 424 below.

A brake pressure circuit 250 adjusts the lever gain associated with lever travel 206. The term "lever gain" refers to the relationship between lever travel and the hydraulic pressure commanded in brake system 260. In the example provided, brake pressure circuit 250 is an electronic circuit that commands brake system 260 based on input from a lever travel sensor 252. For example, brake pressure circuit 250 may command a pressure control solenoid to deliver hydraulic fluid to the braking system at a pressure according to the lever travel and the lever gain. In some embodiments, brake pressure circuit 250 is a mechanically linked system that utilizes mechanical advantage to command higher or lower pressures based on the weight of aircraft 100 and/or other factors.

Brake system 260 includes an actuator 262 and a braking wheel 264. For example, actuator 262 and braking wheel 264 may be conventional braking actuators and braking wheels. In the example provided, actuator 262 is a solenoid that selectively permits hydraulic to engage braking rotors. In some embodiments, actuator 262 is an electronic circuit that manipulates an electronic circuit to provide back EMF to the braking wheel 264. In some embodiments, other types of actuators are utilized.

Figure 4:
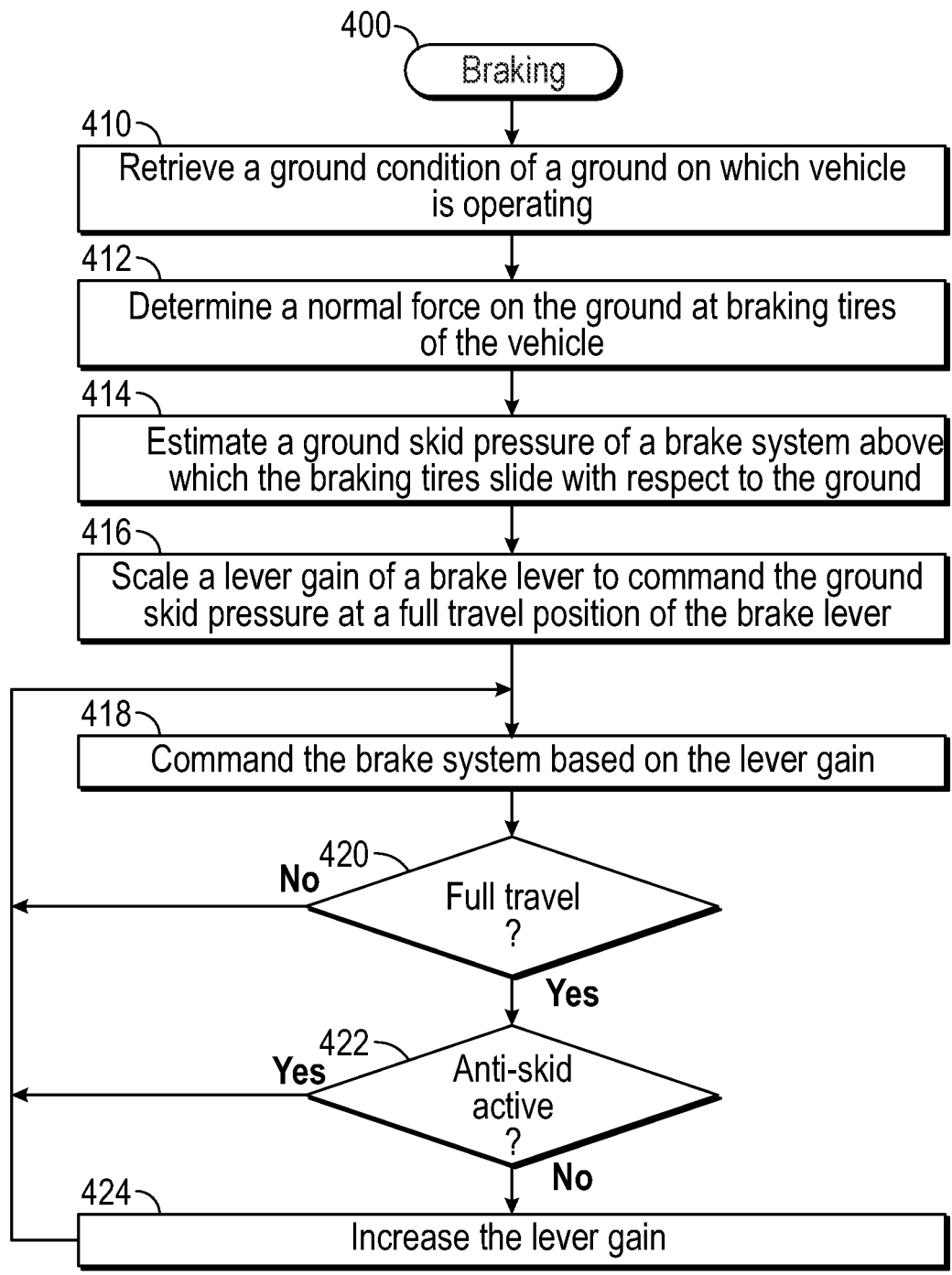
FIG. 4 is a flow chart illustrating a method of braking the aircraft of FIG. 1 in accordance with various embodiments.

Referring now to FIG. 4, a method 400 of applying brakes to a vehicle is illustrated in accordance with some embodiments.

Task 410 retrieves a ground condition of a ground on which the vehicle is operating. The ground condition indicates the coefficient of friction between the aircraft tires and the runway. In the example provided, the ground condition is estimated based on the presence of rain, snow, or other indicators of ground condition.

Task 412 determines a normal force on the ground at braking tires of the vehicle. The weight of the aircraft 100 may double when fully loaded with fuel compared to the same aircraft with a light load of fuel. In the example provided, aircraft 100 considers the weight of fuel and cargo as entered by the pilot prior to takeoff. In some embodiments, a weight sensor on the wheels may be utilized to directly measure the normal force on the ground.

Task 414 estimates a ground skid pressure of a brake system above which the braking tires slide with respect to the ground. For example, task 414 may utilize eq. 1 to estimate the ground skid pressure based on the normal force and the ground condition.

Task 416 scales a lever gain of a brake lever to command the ground skid pressure at a full travel position of the brake lever. For example, a computer in aircraft 100 may scale the brake command so full lever travel gives the pilot the full brake capability estimated in task 414.

Task 418 commands the brake system based on the lever gain. For example, hydraulic pressure in the braking system may press a brake shoe into a brake rotor. Friction between brake shoe and rotor creates friction to slow the aircraft. In other embodiments, the torque in the braking system may come from electrical inductance such as is used in regenerative braking.

Task 420 determines whether the brake lever is at the full travel position. When the brake lever is at the full travel position, method 400 proceeds to task 422. When the brake lever is not at the full travel position, method 400 returns to task 418.

Task 422 determines whether an anti-skid system is active. When the anti-skid system is not active, method 400 proceeds to task 424. When the anti-skid system is active, method 400 returns to task 418.

Task 424 increases the lever gain. For example, brake pressure circuit 250 may increase the pressure commanded to brake system 260 for a given lever travel in task 424. Accordingly, if a pilot reaches full lever travel and the anti-skid system has not engaged, then brake pressure will ramp up until reaching the anti-skid limit. In the example provided, brake pressure circuit 250 increases brake pressure when lever travel is beyond 90% of full lever travel if the anti-skid limit is not reached.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An aircraft, comprising:
 a brake lever for receiving a pilot braking input as a lever travel of the brake lever wherein the brake lever is moveable between a resting position and a full travel position;
 a braking wheel operatively coupled with the brake lever to brake the aircraft based on the lever travel;
 a brake actuator operatively coupled with the braking wheel to apply a braking force in response to a braking pressure provided to the brake actuator; and
 a brake pressure circuit configured for:
  estimating a maximum braking pressure above which the braking wheel will skid with respect to a ground surface;
  scaling a lever gain of the brake lever to command the estimated maximum braking pressure at the full travel position of the brake lever such that, when the brake lever is positioned between the resting position and the full travel position, a remaining amount of brake lever travel to reach the full travel position indicates the amount of braking capability remaining for the aircraft, wherein the lever gain defines a relationship between the lever travel of the brake lever and the braking pressure provided to the brake actuator; and
  braking the braking wheel based on the lever gain and the lever travel.

2. The aircraft of claim 1, wherein the brake pressure circuit is further configured for retrieving a ground condition of the ground surface, and wherein estimating a maximum braking pressure is based in part on the ground condition.

3. The aircraft of claim 1, wherein the brake pressure circuit is further configured for retrieving a normal force applied on the braking wheel by the ground surface, and wherein estimating the maximum braking pressure is based in part on the normal force.

4. The aircraft of claim 3, wherein the brake pressure circuit is further configured for retrieving a weight of the aircraft and for using the weight of the aircraft as an approximation of the normal force.

5. The aircraft of claim 1, wherein the brake pressure circuit is further configured for increasing the lever gain in response to determining that the brake lever is at or near the full travel position and an anti-skid brake system has not activated.

6. The aircraft of claim 5, wherein the brake pressure circuit is configured for increasing the lever gain until the anti-skid system activates while the brake lever is at or near the full travel position.

7. The aircraft of claim 1, wherein the brake pressure circuit is further configured for using a currently scaled lever gain throughout a braking event in response to detecting that an anti-skid system is active when the brake lever is at less than the full travel position to maintain a consistent brake feel throughout the braking event.

8. The aircraft of claim 1, wherein the brake pressure circuit is further configured for scaling the lever gain using a linear scale.

9. A vehicle, comprising:
a brake lever for receiving an operator braking input as a lever travel of the brake lever wherein the brake lever is moveable between a resting position and a full travel position;
a braking wheel operatively coupled with the brake lever to brake the vehicle based on the lever travel; and
a brake pressure circuit configured for:
estimating a maximum braking force above which the braking wheel will skid with respect to a ground surface;
scaling a lever gain of the brake lever to command the estimated maximum braking force at the full travel position of the brake lever such that, when the brake lever is positioned between the resting position and the full travel position, a remaining amount of brake lever travel to reach the full travel position indicates the amount of braking capability remaining for the vehicle, wherein the lever gain defines a relationship between the lever travel of the brake lever and a braking pressure provided to a brake actuator associated with the braking wheel; and
braking the braking wheel based on the lever gain and the lever travel.

10. The vehicle of claim 9, wherein the brake pressure circuit is further configured for retrieving a ground condition of the ground surface, and wherein estimating a maximum braking force is based in part on the ground condition.

11. The vehicle of claim 9, wherein the brake pressure circuit is further configured for retrieving a normal force applied on the braking wheel by the ground surface, and wherein estimating the maximum braking force is based in part on the normal force.

12. The vehicle of claim 11, wherein the brake pressure circuit is further configured for retrieving a weight of the vehicle and for using the weight of the vehicle as an approximation of the normal force.

13. The vehicle of claim 9, wherein the brake pressure circuit is further configured for increasing the lever gain in response to determining that the brake lever is at or near the full travel position and an anti-skid brake system has not activated.

14. The vehicle of claim 13, wherein the brake pressure circuit is configured for increasing the lever gain until the anti-skid system activates while the brake lever is at or near the full travel position.

15. The vehicle of claim 9, wherein the brake pressure circuit is further configured for using a currently scaled lever gain throughout a braking event in response to detecting that an anti-skid system is active when the brake lever is at less than the full travel position to maintain a consistent brake feel throughout the braking event.

16. The vehicle of claim 9, wherein the brake pressure circuit is further configured for scaling the lever gain using a linear scale.

17. A method of braking a vehicle on a ground surface, the vehicle comprising a brake lever that is moveable between a resting position and a full travel position, the method comprising:
retrieving a ground condition of a ground surface on which the vehicle is operating;
determining a normal force on the ground surface at a braking wheel of the vehicle;
estimating a ground skid pressure of a braking system of the vehicle at which the braking wheel begins to slide with respect to the ground surface;
scaling a lever gain of the brake lever to command the estimated ground skid pressure at the full travel position of the brake lever, such that, when the brake lever is positioned between the resting position and the full travel position, a remaining amount of brake lever travel to reach the full travel position indicates the amount of braking capability remaining for the vehicle, wherein the lever gain defines a relationship between the lever travel of the brake lever and a braking pressure provided to a brake actuator associated with the braking wheel; and
commanding the braking system based on the lever gain.

18. The method of claim 17, wherein determining the normal force on the ground surface is based on the weight of the vehicle.

19. The method of claim 17, further comprising increasing the lever gain in response to determining that the brake lever is at the full travel position and an anti-skid brake system has not activated.

20. The method of claim 19, wherein increasing the lever gain includes increasing the lever gain until the anti-skid system activates while the brake lever is at the full travel position.

* * * * *